United States Patent
Onaga

(10) Patent No.: US 6,266,693 B1
(45) Date of Patent: Jul. 24, 2001

(54) METHOD OF CONTROLLING PRINTER INFORMATION IN A NETWORK ENVIRONMENT

(75) Inventor: Tyson Onaga, Cypress, CA (US)

(73) Assignee: Toshiba America Information Systems Inc., Irvine, CA (US)

(*) Notice: Subject to any disclaimer, the term of this patent is extended or adjusted under 35 U.S.C. 154(b) by 0 days.

(21) Appl. No.: 09/143,559

(22) Filed: Aug. 31, 1998

(51) Int. Cl.[7] .............................. G06F 15/16; G06F 9/44
(52) U.S. Cl. ...................... 709/219; 709/250; 395/101; 395/500.42
(58) Field of Search ........................... 709/203, 219, 709/250; 395/101, 500.42

(56) References Cited

U.S. PATENT DOCUMENTS

| | | |
|---|---|---|
| 4,477,901 | 10/1984 | Braband et al. . |
| 5,323,393 | 6/1994 | Barrett et al. . |
| 5,353,399 | 10/1994 | Kuwamoto et al. . |
| 5,537,550 | 7/1996 | Russell et al. . |
| 5,647,056 | 7/1997 | Barrett et al. . |
| 5,727,135 * | 3/1998 | Webb et al. ............... 395/113 |
| 5,819,015 * | 10/1998 | Martin et al. ............. 395/114 |
| 5,862,404 * | 1/1999 | Onaga ........................ 395/828 |
| 6,067,407 * | 5/2000 | Wadsworth et al. ....... 709/250 |
| 6,108,492 * | 8/2000 | Miyachi ..................... 395/114 |
| 6,138,150 * | 10/2000 | Nicholes et al. ........... 709/219 |

FOREIGN PATENT DOCUMENTS

| | | |
|---|---|---|
| 0 745 929 A1 | 12/1996 | (EP) . |
| 0 749 065 A1 | 12/1996 | (EP) . |

OTHER PUBLICATIONS

Hayes, Frank; "The Printers Talk Back", BYTE, Dec. 1993 (vol. 18, No. 13), pp. 103–104, 106 108, 110.

\* cited by examiner

Primary Examiner—Krisna Lim
(74) Attorney, Agent, or Firm—Arter & Hadden LLP

(57) ABSTRACT

A data processing system for printing print jobs originating from workstations on a computer network, for copying copy jobs and for scanning scan jobs to the workstations using an intelligent peripheral device. Status information about the intelligent peripheral device, and setting changes for the intelligent peripheral device, are communicated from network workstations to the intelligent peripheral device via a file server. The processing load of the intelligent peripheral device is thereby reduced. The file server also provides a gate keeper function, limiting the status information and setting changes available to users according to their class: end user, workgroup administrator, network administrator or technician.

14 Claims, 9 Drawing Sheets

METHOD OF CONTROLLING PRINTER INFORMATION IN A NETWORK ENVIRONMENT

RELATED APPLICATIONS

This application is related to Application No. 08/800,859, filed on Feb. 24, 1997, now U.S. Pat. No. 6,108,492, issued on Aug. 22, 2000, entitled "Remote System Monitoring" and Application No. 08/799,527, filed on Feb. 12, 1997, now U.S. Pat. No. 5,862,404, entitled "Method of Administering Work Group Printers" which are incorporated herein by reference.

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to methods of controlling and maintaining electronic equipment, and more particularly to devices such as multifunction peripherals which have advanced processing, status monitoring and configuration capabilities.

2. Description of Related Art

In a typical networked multi-user computer environment, a number of individual workstations are linked together through a network, usually a local area network (LAN). Also linked on the LAN are one or more peripheral devices such as printers, facsimile machines, scanners or plotters. One or more file servers are also linked to the network and serve to manage allocation of the devices to workstations which request the use of the devices. The allocation procedures typically involve accepting requests, determining the address of the device requested, maintaining queues, establishing priorities and relaying data from the workstation to the device.

Typically when a workstation user wishes to determine the status of a device that is networked on a LAN, the method available depends upon the intelligence of the device. The earlier generation of peripherals were "unintelligent," or perhaps, better "uncommunicative." They accepted data from the LAN and processed it according to instructions, but were incapable of relaying conditions back to the LAN. A workstation user, concerned about the status of a device to which he or she had sent a job, would have to leave the workstation to physically examine the device.

A server, such as a file server or a print server, might be able to provide some information regarding the status of a print job. However, this conditions related to the status of the print job in a print queue, and the print queue was neither created, maintained nor serviced by the printer. If a print job was removed from the print queue, one could infer that the printer was handling the print job. However, the status of the print job as it was handled by the printer could not be ascertained. For example, absence of a print job from the print queue could mean that the print job was complete, or it could also mean that the printer had received the print job into its buffer and was still processing the print job. Other features of such a print queue manager were reprioritization of print jobs and deletion of print jobs.

More recently, peripheral devices such as printers have become available which are able to determine and relay information concerning their status through a communications port, such as a network interface card (NIC) or a printer (LPT) port. Thus, information concerning the printer such as its device information (the manufacturer, command set and model of printer), the identity of the job it was currently processing, the status of its paper bins, ink supply, etc. which might be displayed on the printer's display panel, might be also relayed to a computer linked to the peripheral devices through a communications link. An example of this is the Lexmark Optra printer which provides identification data as well as other information as to status. However, querying the device and performing status checks slows the performance of the printer. Furthermore, these systems either provide too much or too little control over the printer.

More recently, peripheral devices have become available which are able to perform a number of related functions. These devices are known as multifunction peripherals (MFPs).

The Telecommunication Industry Association (TIA) has provided an MFP interface standard known as the IS-650 Multifunction Peripheral Industry Interface Standard, Level 1 (MFPI-1) specification version 5.5. According to this standard, an MFP is:

Computer equipment used to scan, print, facsimile transmit, and/or copy documents. It also may have the capability to provide data modem and other voice telephony services. The MFP may be an integrated unit or may be several discrete units that are interconnected on the same communication channel to the Host or interconnected using several different channels. One or more of the subsystems may be omitted from the MFP.

A "Host" as defined in MFPI- 1 is any terminal or computer capable of providing commands and data to operate a peripheral, and in practice is a computer of any size, or a group of network nodes on a given local area network. As used herein, a "host" is a generic Host, providing the quality of functionality specified in MFPI- 1 without necessarily adhering to the specification. A "subsystem" according to MFPI- 1 is one of several logical peripheral units, such as printer, scanner, fax-data-voice (FDV) modem, internal memory, stand-alone controller (SAC), operator console and others which may exist in the MFP or Host. The Host and the MFP communicate through a "channel."

An MFP can operate in stand-alone mode, wherein two or more subsystems are used without interaction with the Host. One example of this is copying. Stand-alone operations may occur at the same time that the Host is accessing a different subsystem for a Host-controlled operation.

In a networked system where many workstations are sharing peripherals, the use of a multifunction peripheral is a mixed blessing. On the one hand, rather than providing, for example, two different scanner functions (one for reading documents for facsimile transmission, one for reading documents for copying) and three different printing functions (one for printing computer generated documents, one for printing documents received through facsimile transmission, and one for printing documents that have been scanned in for copying), a single scanning function and a single printing function perform the work of printer, copier and facsimile machine. On the other hand, the single multifunction peripheral is used at least as often as all of the individual devices would have been used alone. Previously, where there was one user wishing to print a document, one user wishing to transmit a document via facsimile, and one user wishing to copy a document, each would ordinarily each have directed his or her task to a separate machine, and thus not interfere with one another. If any one of these devices was inoperable, the others could perform unimpeded. With a single machine performing all three functions (in our example), maintenance and prompt repairs are more important to ensuring the productivity enhancing capabilities and cost savings of the MFPs.

It is important in the operation of complex electronic equipment, such as MFPs, to maintain the efficiency and productivity of the machine. Machine downtime due to various conditions such as break-downs, malfunctions and errors due to normal wear and tear severely impact machine productivity. In addition, locations with multiple machine operations are often without an immediately available repair and maintenance technician. The machine may be in a geographically remote location, or a responsible technician may be working on another machine. It is important for efficiency to reduce machine down time and to improve the efficiency of technician time spent in monitoring and correcting the machine operation at a specific location.

Given a complex peripheral such as a high volume printer or multifunction peripheral which is attached to a network, a problem arises in controlling the device. One complication is that there are multiple types of users who access the peripheral. In general, users of a peripheral and technicians who need to check the condition of and maintain a peripheral access the peripheral in different ways. Typically, the user has a workstation which can send jobs to the peripheral and receive information regarding the status of the jobs, as error notices regarding things such as paper jams and empty paper trays. Typically, the technician has special equipment which are attached through special ports on the peripheral which permit the technician to obtain the peripheral's settings, diagnose low-level performance problems, and adjust various configurable settings. It can be seen that users and technicians are differentiated simply based upon their physical mode of access to the peripheral.

There generally has been now way, however, to differentiate the level of control and type of status information obtainable by various types of users of a peripheral. Although contemporary network operating systems may restrict access rights of a user or class of users to a peripheral, they do not permit varying levels of access.

SUMMARY OF THE INVENTION

In accordance with the invention, four classes of users have been identified: network administrators, workgroup administrators, end users and technicians. Each of these classes is given access to different classes of peripheral settings and features. A network administrator is allowed to control settings relating to how the peripheral interoperates with the network, and the status of jobs being processed by the peripheral. A workgroup administrator is allowed to control settings relating to how a corresponding workgroup uses the peripheral, including workgroup address books, letterhead features, watermarks, etc. End users have fairly limited access, primarily only the right to use the peripheral and to determine the status of their own jobs submitted to the peripheral. Technicians have access to the peripheral through the same type of workstation user interface provided to other users, and are allowed to access factory-level settings of the peripheral, such as counters for periodic maintenance, temperature settings, automatic processing settings, etc. In many cases, the access rights on one class are exclusive. Thus, technicians may access the factory-level settings, but have no need to access workgroup information or network configuration information.

In addition to the preset assignment of rights, the network administrator is also given the limited right to add, remove and delete access of workgroup administrators and end users to certain settings and functions.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
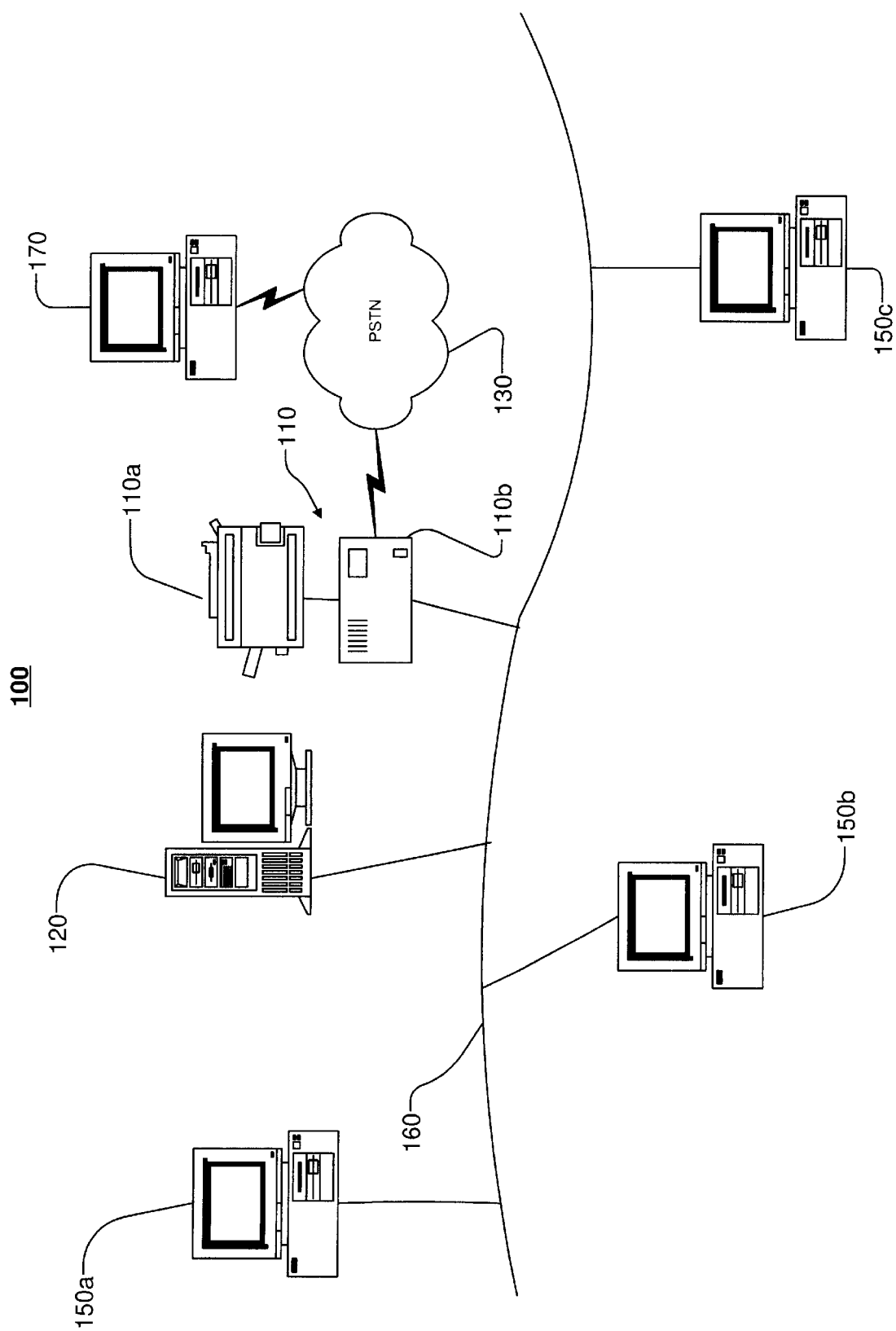
FIG. 1 is a block diagram of a computer network in accordance with the invention.

FIG. 1 shows a local area network (LAN) 100. Before proceeding to describe the LAN 100, a few terms are defined. By "file server," it is meant a computer which controls access to file and disk resources on a network, and provides security and synchronization on the network through a network operating system. By "server," it is meant hardware, software or combinations of hardware and software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing.

By "intelligent peripheral device," it is meant a special purpose I/O processing device which is capable of relaying information concerning its current status via a communications line. The "status information" of an intelligent peripheral device is transient, process-dependent information and may be, for example, the intelligent peripheral device's unique network address, which job is currently being handled, how much of the job is completed, paper supply status, and ink or toner supply levels. Settings are static and relate to how operations are to be performed. Status information may concern the MFP or the Host. Settings of both the MFP and the Host are stored.

To network communication lines 160 are coupled a number of workstations 150a, 150b, 150c, a file server 120 and an intelligent peripheral device 110. The file server 120 and workstations 150 are preferably those well known in the art, such as computers having Intel Corporation (Santa Clara, Calif.) microprocessors and running Microsoft Corporation (Redmond, Wash.) Windows operating systems. The network communications lines 160 may be wire, fiber, or wireless channels as known in the art. Although only one file server is shown, the network 100 may include multiple file servers with different network operating systems and providing multiple access domains. The network 100 may also include hubs, routers and other devices (not shown).

The intelligent peripheral device 110 preferably comprises an MFP 110a coupled to a Host 110b. The Host 110b is coupled to the network communication lines 160. Preferably, the Host 110b is a general purpose computer, having neither monitor, keyboard nor mouse, and running the Microsoft Windows NT operating system. The Host 110b functions as a server to provide appropriate peripheral services to the workstations 150 and the file server 120 on the network 100.

FIG. 1 also shows a remote monitoring computer 170 coupled to the Host 110b by a public switched telephone network 130. The remote monitoring computer 170 and public switched telephone network 130 are not part of the LAN 100. The remote monitoring computer 170 is preferably generally as known in the art having an Intel microprocessor and running Microsoft Windows, but also having special programs for interaction with the Host 110b as set forth below. Preferably, the remote monitoring computer 170 has the same user interface as the workstations 150.

Figure 2:
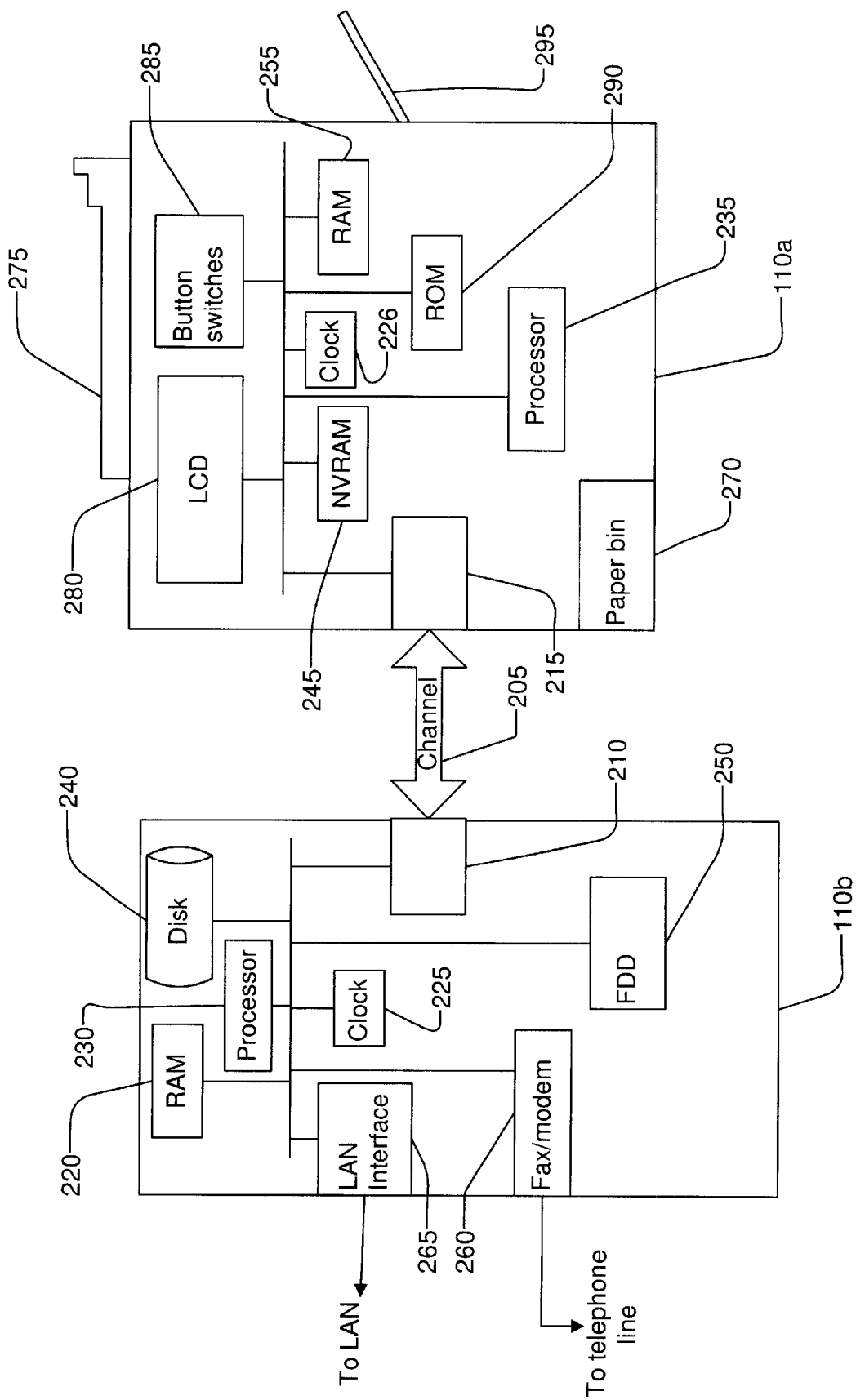
FIG. 2 is a block diagram of a data processing system including a Host and an MFP in accordance with the invention.

Referring now to FIG. 2, there is shown a block diagram of the Host 110b and the MFP 110a. The MFP 110a preferably comprises a high output digital copier having a communications interface 215 (preferably SCSI) and a hardware and software interface which allows the MFP 110a to receive rasterized print jobs from the Host 110b, manage the print jobs as well as its own copyjobs, and print the print jobs. The hardware includes a non-volatile data storage device 290 (preferably ROM or EPROM) and processor 235 in which programs are stored and run, respectively, for controlling the functions of the MFP 110a. The MFP 110a preferably also includes a short term rewritable data storage device 255 such as a RAM. The MFP 110a also includes a non-volatile rewritable data storage device 245 such as an NVRAM for storage of various information, include information regarding the status of operation of the MFP 110a. The MFP 110a includes standard components including automatic document feeder 275, paper bin 270 and paper output tray 295.

The MFP 110a includes a non-fixed display 280, preferably an LCD, and user input device 285, such as button switches. The MFP 110a has user interface software stored in the data storage device 290 which is responsible for displaying information on the display 280 and interpreting user inputs from the user input device 285.

The Host 110b preferably comprises a server such as a computer having an Intel processor 230 and running Microsoft Windows NT. To maximize performance, there is preferably a one-to-one correspondence between Hosts and MFPs. In conjunction with the processor 230, the Host 110b has a clock 225, a short term rewritable data storage device 220 (preferably RAM) and a non-volatile rewritable data storage device 240 (preferably a hard disk) as known in the art. The Host 110b further includes a communications interface 210 through which the Host 110b communicates with the MFP 110a through a channel 205. Preferably, the communications interface 210 is configured as a SCSI host. The Host 110b further preferably includes a fax/modem 260 for sending and receiving faxes via telephone lines 130 and for communicating with the remote monitoring computer 170. The Host 110b includes management software stored in the long term data storage device 240 for managing print jobs, fax jobs and scan jobs. The Host 110b rasterizes print jobs from the LAN 100 into print data (a form native to the MFP 110a) and transmits the print data to the MFP 110a via the communications channel 205. The Host preferably also has a removable storage device 250 such as a floppy drive which uses a removable storage medium such as a floppy disk (not shown).

The Host's fax/modem 260 is used for communicating conditions to the remote monitoring computer 170. The fax/modem 260 is also used for sending fax jobs from the workstations 150 or originating from the MFP 110a, as well as receiving faxes which are generally printed by the MFP 110a. Thus, the processor 230 also tests the status of the fax/modem 260 before use and preferably queues outbound traffic. Preferably, notification has a higher priority than outbound faxes.

The MFP's processor 235, under programmed control, is responsible for monitoring the status of the MFP and updating a status information table stored in the non-volatile rewritable data storage device 245. The MFP's processor 235 operates in accordance with a clock 226 in the MFP 110a. Table 1 below sets forth a list of the MFP status information which is preferably included in the status information table.

TABLE 1

| Status Information | Value Range | Initial Value | Privileges |
|---|---|---|---|
| Date/Time setting | 12 chars | | R/W |
| Auto Power off | 0–15 | 0 | R/W |
| Auto Power saving | 0–20 | 9 | R/W |
| Version | 0–2 | 0 | |
| Time mode(Auto clear) | 0–10 | 3 | R/W |
| Service personnel telephone number | 10 digits | | |
| PM counter setting value | 0–999,999 | 0 | |
| PM counter current value | 0–999,999 | 0 | |
| ADU/main unit cassette installation status | 0–2 | 0 | |
| PFP installation status | 0 | 0 | |
| MAX9 | 0 | 0 | R/W |
| Print priority order for interrupt copy and fax memory full | 0 | 0 | |
| Electronic total counter | 0–999,999 | 0 | |
| A3/LD double count | 0 | 0 | |
| C7 counter | 0–3 | 0 | |
| Drum life counter | 0–999,999 | 0 | |
| Electric current time counter | 0–999,999 | 0 | |

TABLE 1-continued

| Status Information | Value Range | Initial Value | Privileges |
|---|---|---|---|
| Fuser counter (synchronous with total counter) | 0–999,999 | 0 | |
| Developer counter | 0–999,999 | 0 | |
| Drum electric potential control (counter correction) | 0–1 | 1 | |
| Pre-run starting time | 0–15 | 6 | |
| Pre-run operation time | 0–24 | 2 | |
| Fixing temperature during printing | 0–24 | 18 | |
| Change amount of fixing temperature during PRINTING --> READY | 0–6 | 0 | |
| Fixing temperature in the power save state | 0–24 | 0 | |
| Fixing temperature for thick sheets | 0–4 | 0 | |
| Setting of transfer and sheet separation correction conditions | 0–3 | 0 | |
| Black strip between papers | 0–4 | 0 | |
| Drum electric potential control (temperature correction) | 0–1 | 1 | |
| Laser power correction values | 0–255 | 127 | |
| APS Carriage start timing | 0–15 | 0 | |
| ADF switchback | 0–1 | 0 | |
| Cassette priority selection | 0–6 | 0 | |
| Image mode default | 0–2 | 0 | |
| Photo mode setting | 0–1 | 0 | |
| Intensity default for photo mode | 0–1 | 0 | |
| Intensity default for standard mode | 0–1 | 0 | |
| Intensity default for text mode | 0–1 | 0 | |
| Enlargement/reduction random interpolation | 0–1 | 0 | |
| Image mode default | 0–1 | 0 | |
| Photograph mode setting | 0–1 | 0 | |
| Intensity default for photograph mode | 0–1 | 0 | |
| Intensity default for standard mode | 0–1 | 0 | |
| Intensity default for text mode | 0–1 | 0 | |
| Smoothing (standard) | 0–1 | 0 | |
| Smoothing (text) | 0–1 | 0 | |
| ID code mode | 0–1 | 0 | R/W |
| Secondary scan magnification adjustment | 0–1 | 0 | |
| Automatic two-sided mode | 0–2 | 0 | R/W |
| APS priority selection | 0–2 | 0 | |
| SAPS mode | 0–2 | JPN:0 US:0 EUR:1 | |
| ADF priority mode selection | 0–1 | 0 | |
| PM memory quantity secured | 0–1 | 0 | |
| Form registering | 0–1 | 0 | |
| Two-sided original document selection for books | 0–1 | 0 | R/W |
| [USER] key original document size selection | 4–9 20–23 28–37 | 9 38 37 | |
| [USER] key paper size selection | 4–7 20–23 28–37 | 9 38 37 | |
| Manual feed auto start | 0–1 | 0 | |
| Date format | 0–2 | 0 | R/W |
| Sorter mode priority selection | 0–3 | 0 | R/W |
| Adjustment magnification during editing | 0–10 | 10 | |
| Input image position during continuous page copying | 0–1 | 0 | |
| Entry mode priority selection | 0 | 0 | |

Preferably, the MFP 110a also utilizes a number of settings for its basic operating characteristics. Table 2 below sets forth a list of the preferred MFP 110a settings.

TABLE 2

| Setting Information | Value Range | Initial Value | Privileges |
|---|---|---|---|
| Auto-toner automatic adjustment (heat roller lamp ON) | — | — | |
| Auto-toner sensor initial value adjustment | 0–255 | 127 | |
| Developing bias DC adjustment (Developing bias DC:ON) | 0–255 | 128 | |
| Grid voltage initial value adjustment (Main motor, discharger, charger, grid:ON) | 0–255 | 128 | |
| Transfer transformer DC output, high Center and low adjustments | 0–255 | 160 | |
| Separation AC output, high, center and low adjustments | 0–255 | 128 | |
| Cleaner pre-discharging AC output adjustment | 0–255 | 128 | |
| Laser automatic adjustment | 0–255 | — | |
| Laser sharpness, minimum, maximum and center values | 0–255 | 127 | |
| Scanner secondary scan magnification | 0–255 | 127 | |
| Scanner secondary scan displacement | 0–255 | 127 | |
| CCD primary scan displacement | 0–255 | 128 | |
| Halogen lamp lighting voltage setting | 0–15 | 8 | |
| White shading value display | | — | |
| Original document edge image cut-Basic PPC | 0–255 | 127 | |
| Original document edge image cut-Expansion PPC | 0–255 | 127 | |
| Original document edge void gradation | 0–255 | 128 | |
| Secondary scan magnification, main and resist motors speed fine adjustment | 0–255 | 127 | |
| Laser firing position | 0–255 | 127 | |
| Margins-Basic and | 0–255 | 127 | |

TABLE 2-continued

| Setting Information | Value Range | Initial Value | Privileges |
|---|---|---|---|
| Expansion PPC | | | |
| Leading edge positions | 0–255 | 127 | |
| Aligning quantities | 0–255 | 127 | |
| Manual intensity fine adjustments | 0–255 | 127 | |
| Auto intensity fine adjustments | 0–255 | 127 | |
| User intensity center curve setting | [(−128)–((127)] x 17 | | |
| User intensity center curve selections | 0–15 | 0 | |
| Foundation cut quantity fine adjustments | 0–255 | 255 | |
| Black standard value offset quantities | 0–255 | 255 | |
| Range correction B/W standard values | 0–255 | 0 | |
| Foundation range width adjustments | 0–15 | 0 | |
| Gamma correction | | — | |
| Coefficient setting for LPF and HPF | 0–255 x 4 | 0 x4 | |
| LPF and HPF settings for various enlargement/reduction modes | 0–255 | 0 | |
| Enlargement/reduction random interpolation | 0–63 | 0 | |
| During smoothing ON Halftone judgement threshold value | 0–255 | 13 | |

Figure 3:
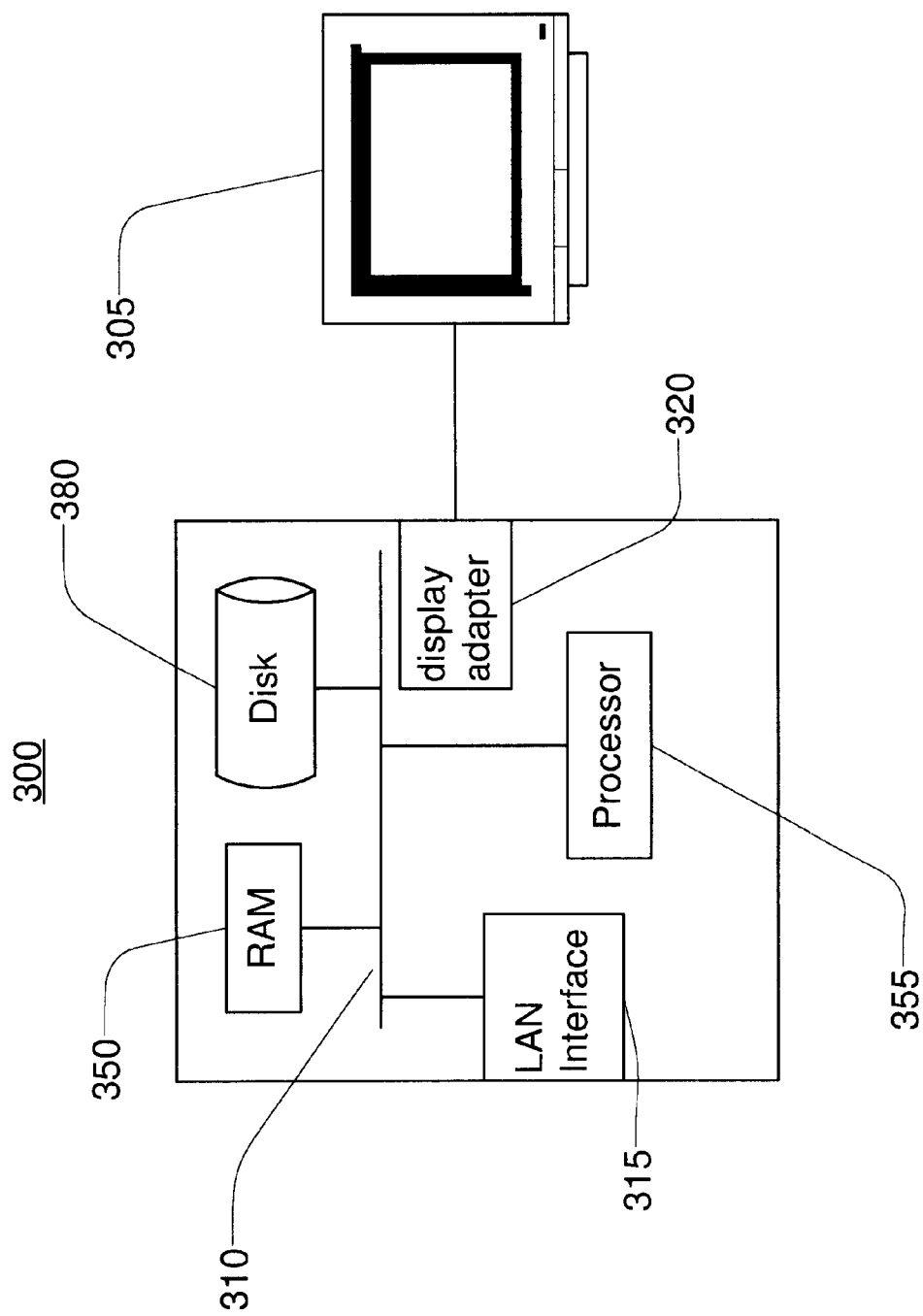
FIG. 3 is a block diagram of a general purpose computer.

FIG. 3 shows a general purpose computer 300 which is representative of the workstations 150 and file server 120. The computer 300 preferably includes an Intel Corporation (San Jose, Calif.) processor 355 and runs a Microsoft Corporation (Redmond, Wash.) Windows operating system. In conjunction with the processor 355, the computer 300 has a short term memory 350 (preferably RAM) and a long term memory 380 (preferably a hard disk) as known in the art. The computer 300 further includes a LAN interface 315, a monitor 305, a display adapter 320 and a bus 310, as known in the art.

Figure 4:
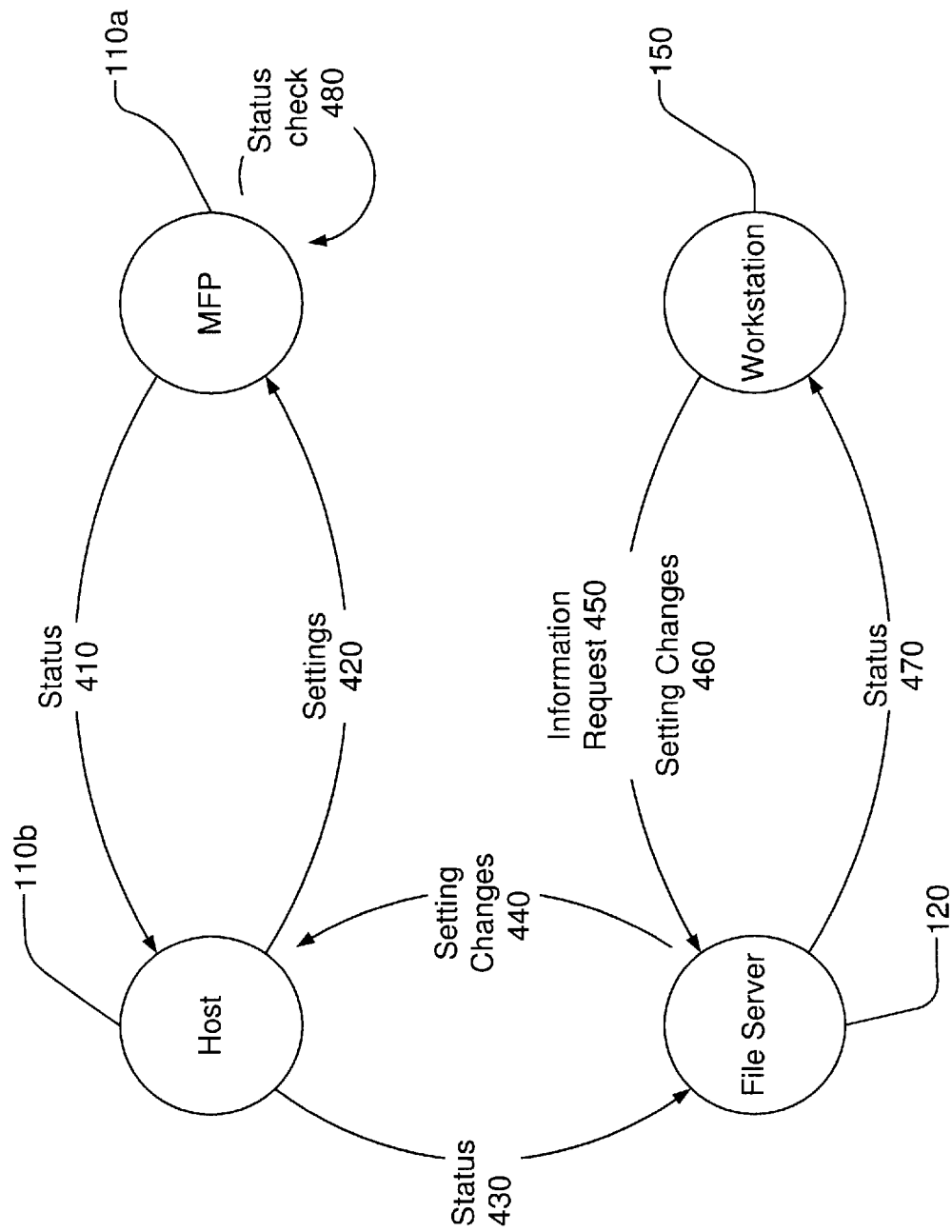
FIG. 4 is a conceptual block diagram of data flows in the data processing system of FIG. 2.

Turning now to FIG. 4, the flow of data amongst the MFP 110a, the Host 110b, the file server 120 and the workstation 150 in accordance with the invention is shown. There are essentially two data flows: a first flow of status information from the multifunction peripheral 110a to the workstation 150, and a second flow of setting information from the workstation to the multifunction peripheral.

The flow of status information from the multifunction peripheral 110a to the workstation 150 has essentially four parts. First, in loop 480, the multifunction peripheral 110a determines its operating status. Second, in flow 410, the multifunction peripheral 110a communicates status information to the Host 110b. Third, in flow 430, the Host 110a communicates the status information to the file server 120. Fourth, in flow 470, the file server 120 communicates the status information to the workstation 150.

The flow of setting information from the workstation 150 to the multifunction peripheral 110a has essentially three parts. First, in flow 460 the workstation 150 communicates setting information to the file server 120. Second, in flow 430 the file server 120 communicates the setting information to the Host 110b. Third, in flow 420, the Host 110b communicates the setting information to the multifunction peripheral 110a.

The file server 120 plays an important gate keeping role in these data flows. In accordance with the invention, four classes of users have been defined: network administrators, workgroup administrators, end users and technicians. The privileges of the user classes (network administrator, workgroup administrator, end user and technician) are preferably stored in the file server 110. Each of these user classes is given access to different classes and quantities of intelligent peripheral device 110 status information and are permitted to change different classes and quantities of intelligent peripheral device 110 settings. Preferably, each class's privileges may be tailored to each intelligent peripheral device 110 in the network. If a user does not have an account on a given intelligent peripheral device 110 and he is not a network administrator, then his privileges are preferably automatically set to those of an end user.

Privileges may be either read/write, restricted read/write, or read only.

Network administrators have full read/write privileges of all settings and status information. The privileges of network administrators are preferably fixed and thus are not modifiable. Preferably, only network administrators may create user records with privileges of technician or network administrator.

A workgroup administrator is allowed to read and change settings relating to how a corresponding workgroup uses the intelligent peripheral device, including workgroup address books, letterhead features, watermarks, etc. Thus, a workgroup administrator may be given restricted read/write privileges overs these manageable date objects.

End users have fairly limited rights, primarily only the right to use the intelligent peripheral device in the manner defined by the workgroup administrator, and to determine the status of their own jobs submitted to the intelligent peripheral device.

Technicians have access to the intelligent peripheral device through the same type of workstation user interface provided to other users, and are allowed access to factory-level status information of the intelligent peripheral device, such as counters for periodic maintenance, temperature settings, automatic processing settings, etc., and technicians have control over factory-level settings.

An example of status information privileges and setting information privileges is shown in Tables 1 and 2, respectively. The last column of Table 1 reflects which user types are given privilege to view the respective status information. The last column of Table 2 reflects which user types are given privilege to change the respective setting information. Initially, the network administrator and work group administrator have the same privileges. However, the network administrator has rights to change the work group administrator privileges to copier attributes. Technicians have read access to all status information and setting information, and may change those indicated in Table 2.

In addition to the preset assignment of rights, network administrators are also given the limited privilege to add, remove and delete access of workgroup administrators and end users to certain settings and functions.

MFP Process

Figure 5:
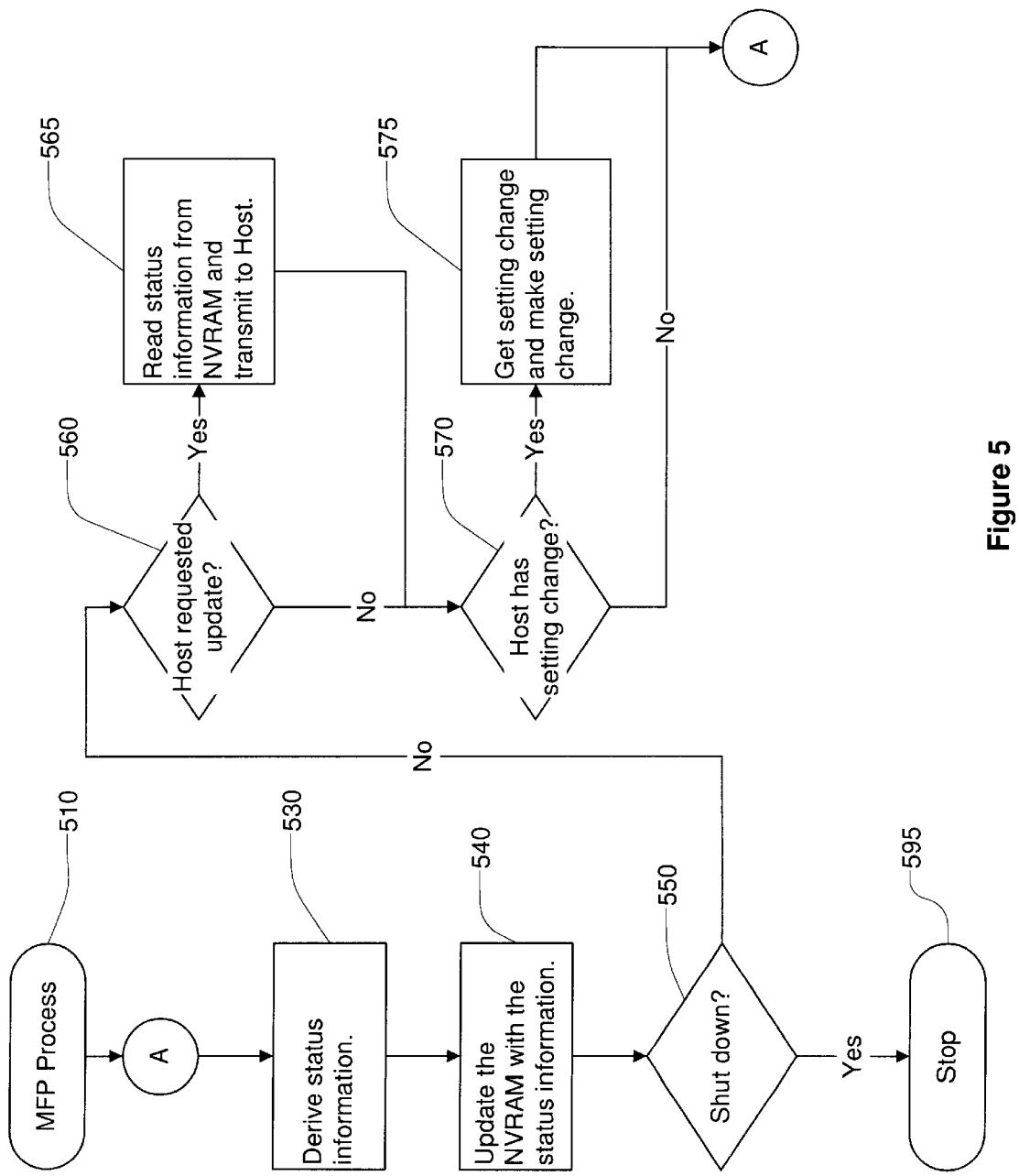
FIG. 5 is a flow chart of an MFP process in accordance with the invention.

The MFP 110a preferably performs a programmed loop as shown in the flow chart of FIG. 5. After the program is started (step 510), the MFP 110a derives its status information (step 530), and updates a table or database in the data storage device 245 with the status (step 540). If the MFP 110a is to be shut down (step 550), the process will of course terminate (step 595). There may also be other reasons for stopping the process.

If the process is to continue, then in step 560 the MFP 110a checks if the Host 110b has requested the current status. If so, then the processor 235 reads the status from the data storage device 245 and transmits the status via the communications interface 215 to the Host 110b (step 565).

In either case, the loop continues with the MFP 110a checking if the Host 110b has any setting changes (step 570). If so, then the MFP 110a gets the setting changes from the Host 110b and makes the changes (step 575). In either case, control continues at step 530.

Host Process

Figure 6:
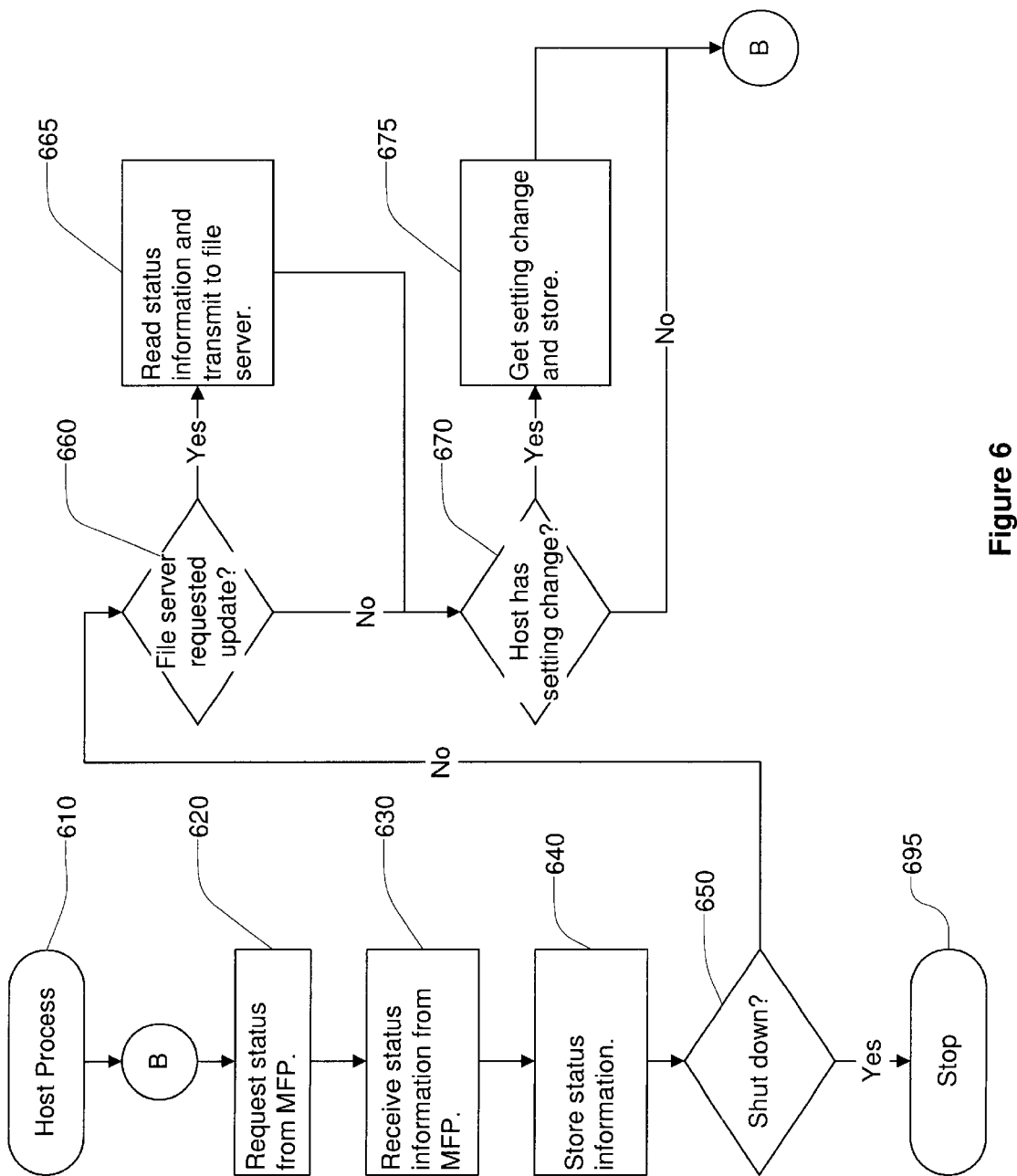
FIG. 6 is a flow chart of a host process in accordance with the invention.
Figure 7:
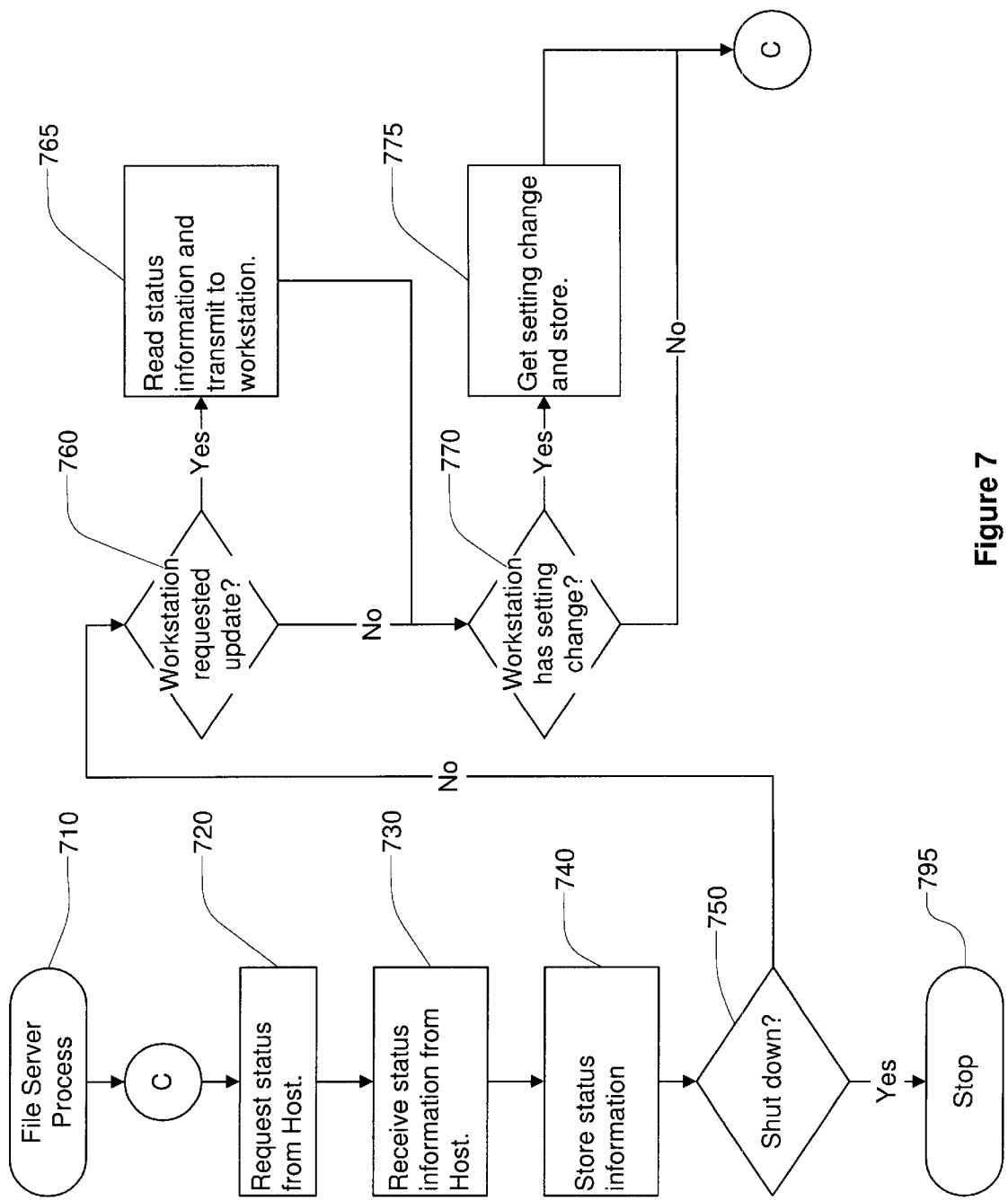
FIG. 7 is a flow chart of a file server process in accordance with the invention.
Figure 8:
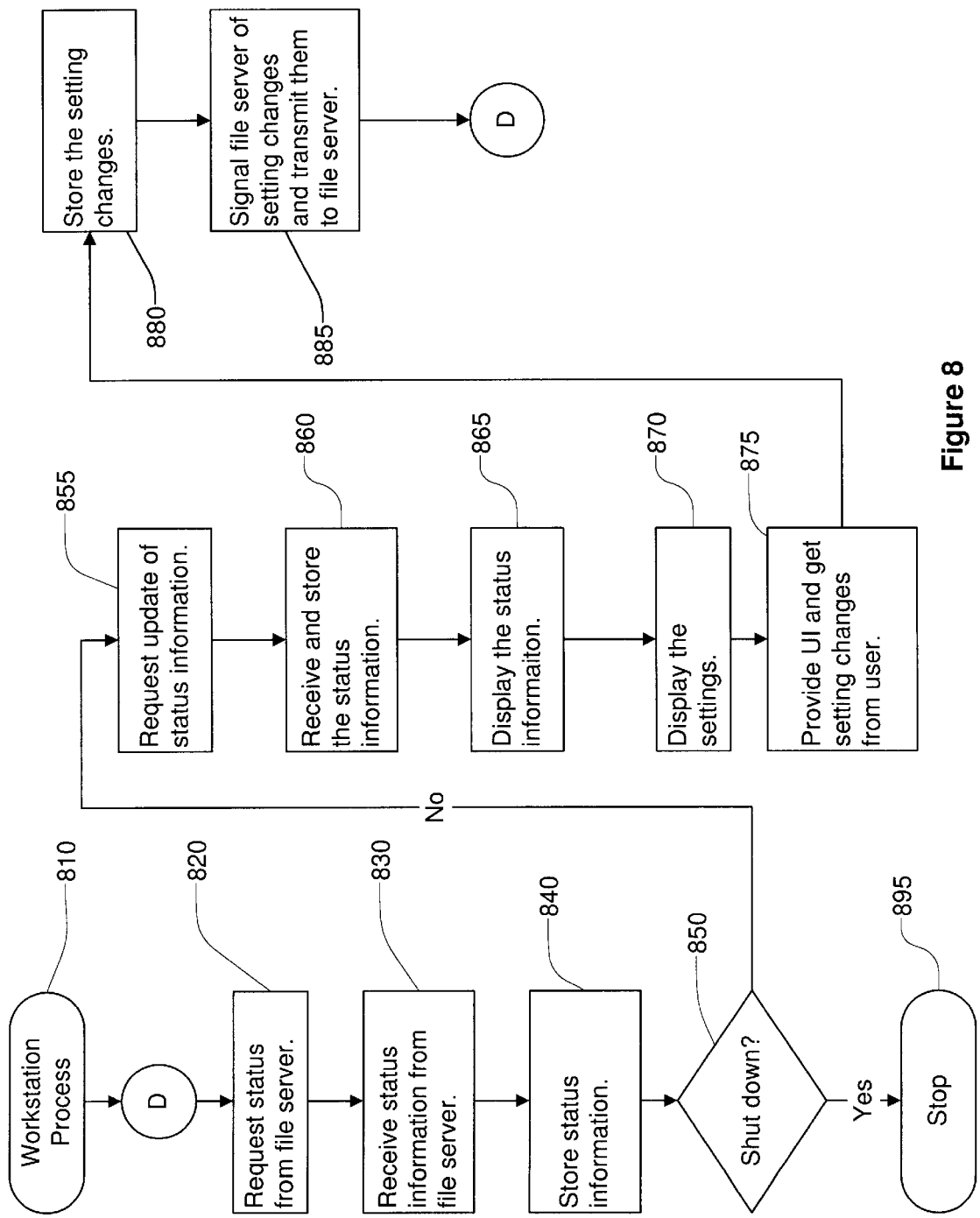
FIG. 8 is a flow chart of a workstation process in accordance with the invention.

The Host 110b preferably performs a programmed loop as shown in the flow chart of FIG. 6. The Host 110b is responsible for initiating a refresh of a status information database in the long term data storage device 240, and for communicating setting changes from the workstation 150 to the MFP 110a. The Host 110b preferably initiates a refresh of the status information on a periodic basis, but could also initiate refreshes on an event-driven basis, such as when the workstation 150 requests status information or requests a setting change.

After the program is started (step 610), the Host 110b generates a signal to the MFP 110a to request that the MFP 110a transmit the status information to the Host 110b (step 620). The Host 110b then receives the status information from the MFP 110a (step 630), and the Host 110b stores the status information in the data storage device 240 (step 640).

If the Host 110b is to be shut down (step 650), the process will of course terminate (step 695). There may also be other reasons for stopping the process.

Otherwise, the Host 110b determines whether the file server 120 has requested a refresh of the status information (step 660). If so, the Host 110b reads the status information from the data storage device 240 and transmits the status information to the file server 120 (step 665).

In either case, the loop continues with the Host 110b checking if the file server 120 has any setting changes (step 670). This is preferably achieved by the Host 110b generating a signal to the file server 120 to request that the file server 120 transmit the setting information to the Host 110b. If the file server 120 has setting changes, then the Host 110b gets the setting changes from the file server 120 and stores the setting changes in the data storage device 240 (step 675). In either case, control continues at step 620.

File Server Process

After the program is started (step 710), the file server 120 generates a signal to the Host 110b to request that the Host 1110b transmit the status information to the file server 120 (step 720). The file server 120 then receives the status information from the Host 110b (step 730), and the file server 120 stores the status information in its data storage device (step 740). Preferably the file server 120 stores and maintains the status information in the manner described in application Ser. No. 08/799,527 entitled "Method of Administering Work Group Printers" which is incorporated herein by reference.

If the file server 120 is to be shut down (step 750), the process will of course terminate (step 795). There may also be other reasons for stopping the process.

Otherwise, the file server 120 determines whether the workstation 150 has requested a refresh of the status information (step 760). If so, the file server 120 reads the status information from its data storage device and transmits the status information to the workstation 150 (step 765).

In either case, the loop continues with the file server 120 checking if the workstation 150 has any setting changes (step 770). This is preferably achieved by the file server 120 generating a signal to the workstation 150 to request that the workstation 150 transmit the setting information to the file server 120. If the workstation 150 has setting changes, then the file server 120 gets the setting changes from the workstation 150 and stores them in its data storage device (step 775). In either case, control continues at step 720.

Preferably, the file server 120 checks the user type at each status information request or setting information change. The file server 120 preferably only gets status information which a requesting workstation 150 has permission to get.

In peer-to-peer networks, a file server such as file server 120 may not be available. In such a situation, the Host 110b preferably performs the file server processes described herein. In such a case, communications of information from Host to file server are instead communications between processes within the Host 110b.

Workstation Process

The workstation 150, rather than querying the intelligent peripheral device 110 for its status and sending setting changes directly to the intelligent peripheral device 110, instead queries the file server 120 for the status information and passes setting changes to the file server for relay to the intelligent peripheral device 110.

After the program is started (step 810), the workstation 150 generates a signal to the file server 120 to request that the workstation 120 transmit the status information to the workstation 150 (step 820). The workstation 150 then receives the status information from the file server 120 (step 830), and the workstation 150 stores the status information in its data storage device (step 840).

If the workstation 150 is to be shut down (step 850), the process will of course terminate (step 895). There may also be other reasons for stopping the process.

Otherwise, the workstation 150 requests a refresh of the status information (step 855). After the file server 120 transmits the status information to the workstation 150, the workstation stores the status information in its data storage device (step 860). The workstation 150 then displays the status information on its display so that the user may appreciate the status of the intelligent peripheral device 110.

The workstation 150 next provides a display on the display of current settings of the intelligent peripheral device 110, and permits the user to indicate which settings the user wishes to change and the nature of the change (step 875). Preferably, status information is refreshed at different rates to improve performance and reduce network congestion. After storing the setting changes (step 880), the workstation 150 signals the file server 120 that the workstation 150 has setting changes to transmit and transmits the setting changes to the file server (step 885).

Figure 9:
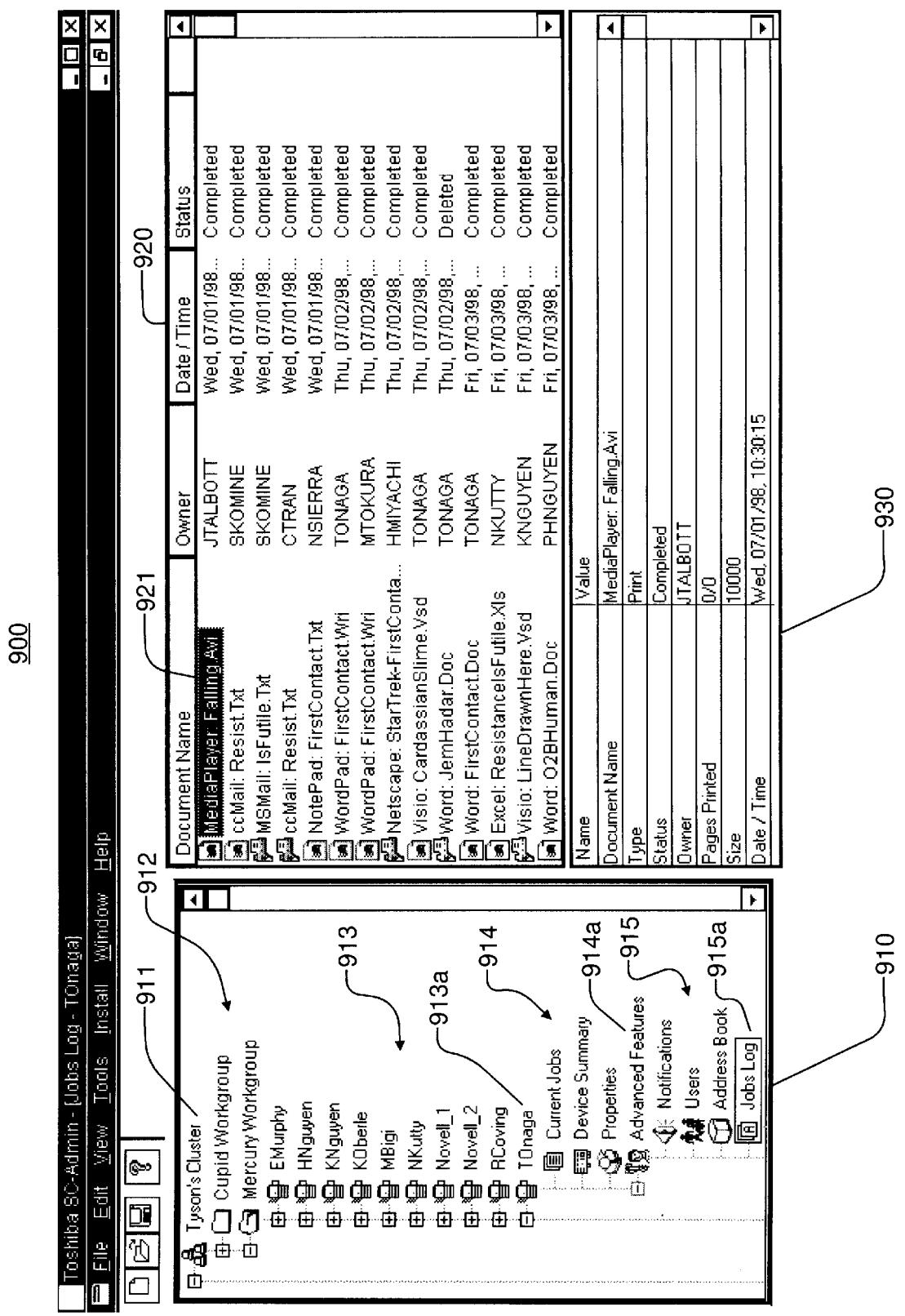
FIG. 9 is a screen shot of a status information and setting control program for an administrator in accordance with the invention.

Referring now to FIG. 9, there is shown a screen shot of a status information and setting control program for an administrator in accordance with the invention. A window 900 includes standard Microsoft Windows controls and features which will be apparent to those of skill in the art. The window 900 includes three panes 910, 920, 930 relating the status information and setting control. The pane 910 provides a hierarchical list of available devices 913. The devices 913 are organized by cluster 911 and workgroup 912. For each device 913 there may be a number of objects 914 relating to the available settings and status for the device 913. Those objects 914 may themselves relate to other objects 915. The panes may be tiled as shown or layered as is known in the art.

For example, for a device 913a called TOnaga, there might be four objects 914, called Current Jobs, Device Summary, Properties and Advanced Features. These objects represent logical organizations of the status information and settings for the device 913a. The pane 920 displays details about a selected object 915a of the Advanced Features object 914a. Accordingly, the pane 920 lists the names of documents being printer, the owner of the jobs, the date and time the job was submitted and the status of the job. By selecting one of the jobs 921, more details are made available in pane 930. By selecting other objects similar presentations are made.

The Advanced Features object 914a provides an entry point in the display 900 for a network administrator to manage the privileges of other users.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of allowing a user at a workstation to control settings of an intelligent peripheral device under control of a file server, the method comprising:

(a) the intelligent peripheral device determining operating conditions of plural predetermined aspects of the intelligent peripheral device;

(b) the intelligent peripheral device deriving status information regarding the operating conditions of the intelligent peripheral device;

(c) the intelligent peripheral device updating a first rewritable data storage device with the status information;

(d) the file server generating a first signal to the intelligent peripheral device to request that the intelligent peripheral device transmit the status information to the file server;

(e) the intelligent peripheral device reading the status information from a first data storage device;

(f) the intelligent peripheral device transmitting the status information to the file server;

(g) the file server receiving the status information from the intelligent peripheral device;

(h) the file server storing the status information in a second rewritable storage device;

(i) the workstation generating a second signal to the file server to request that the file server transmit the status information to the workstation;

(j) the file server reading the status information from the second data storage device;

(k) the file server transmitting the status information to the workstation;

(l) the workstation receiving the status information from the file server;

(m) the workstation storing the status information in a third rewritable data storage device;

(n) the workstation displaying on the display the status information from the third rewritable storage device;

(o) the workstation displaying on the display intelligent peripheral device settings available for change by the user;

(p) the workstation providing a user interface to the user through which the user inputs at least one intelligent peripheral device setting which the user desires to be changed a the setting information;

(q) the workstation storing the setting information in the third rewritable storage device;

(r) the workstation generating a third signal to the file server to request that the file server accept the setting information from the workstation;

(s) the file server generating a fourth signal to the workstation to request that the workstation transmit the setting information to the file server;

(t) the workstation reading the setting information from the third data storage device;

(u) the workstation transmitting the setting information to the file server;

(v) the file server receiving the setting information from the workstation;

(w) the file server storing the setting information in the second rewritable non-volatile data storage device;

(x) the file server generating a fifth signal to the intelligent peripheral device to request that the intelligent peripheral device accept the setting information from the file server;

(y) the intelligent peripheral device generating a sixth signal to the file server to request that the file server transmit the setting information to the intelligent peripheral device;

(z) the file server reading the status information from the third data storage device;

(aa) the file server transmitting the status information to the workstation;

(bb) the intelligent peripheral device receiving the setting information from the file server;

(cc) the intelligent peripheral device storing the setting information;

(dd) the intelligent peripheral device modifying its operation in accordance with the setting information.

2. The method of allowing a user at a workstation to control settings of an intelligent peripheral device under control of a file server of claim 1, further comprising:

(a) the file server storing a permissions table of user types and permissions associated with each user type, the user types comprising technician, standard user and network administrator, the permissions comprising:

(i) for technicians, access to all status information and changes to all setting information;

(ii) for standard users, access to status information and changes to setting information;

(iii) for network administrators, access to all status information and changes to setting information;

(b) the workstation receiving from the user an input determinative of the user's user type;

(c) the workstation communicating the user type of the user to the file server.

3. The method of allowing a user at a workstation to control settings of an intelligent peripheral device under control of a file server of claim 2, wherein the workstation communicates the user's user type to the file server prior to the file server transmitting the status information to the workstation, and the file server limiting the status information transmitted to the workstation in accordance with the user type.

4. The method of allowing a user at a workstation to control settings of an intelligent peripheral device under control of a file server of claim 2, wherein the workstation communicates the user's user type to the file server prior to the file server transmitting the setting information to the intelligent peripheral device, and the file server limiting the setting information transmitted to the intelligent peripheral device in accordance with the user type.

5. The method of allowing a user at a workstation to control settings of an intelligent peripheral device under control of a file server of claim 2, the user types further comprising workgroup administrators and the permissions for workgroup administrators comprising access to status information and changes to setting information.

6. The method of allowing a user at a workstation to control settings of an intelligent peripheral device under control of a file server of claim 1, wherein the step of the file server generating the first signal to the intelligent peripheral device to request that the intelligent peripheral device transmit the status information to the file server is performed periodically according to predetermined timing.

7. The method of allowing a user at a workstation to control settings of an intelligent peripheral device under control of a file server of claim 1, wherein the step of the file server generating the first signal to the intelligent peripheral device to request that the intelligent peripheral device transmit the status information to the file server is performed in response to the workstation, at a prior time, generating the second signal to the file server to request that the file server transmit the status information to the workstation.

8. The method of allowing a user at a workstation to control settings of an intelligent peripheral device under control of a file server of claim 1, wherein the first signal, the second signal, the third signal, the fourth signal, the fifth signal and the sixth signal comprise data signals carried on electronic communications media.

9. The method of allowing a user at a workstation to control settings of an intelligent peripheral device under control of a file server of claim 1, wherein the setting information includes any of the items in Table 2.

10. The method of allowing a user at a workstation to control settings of an intelligent peripheral device under control of a file server of claim 1, wherein the status information includes any of the items in Table 1.

11. The method of allowing a user at a workstation to control settings of an intelligent peripheral device under control of a file server of claim 1, the intelligent peripheral device comprising a multifunction peripheral comprising the first rewritable storage device, and a host comprising a fourth rewritable storage device, wherein (a) steps (a) through (g) of claim 1 comprise:
the multifunction peripheral determining operating conditions of plural predetermined aspects of the multifunction peripheral;
the multifunction peripheral deriving the status information regarding the operating conditions of the multifunction peripheral;
the multifunction peripheral updating the first data storage device with the status information;
the host generating a seventh signal to the multifunction peripheral to request that the multifunction peripheral transmit the status information to the host;
the multifunction peripheral reading the status information from the first data storage device;
the multifunction peripheral transmitting the status information to the host;
the host receiving the status information from the multifunction peripheral;
the host storing the status information in the fourth data storage device;
the file server generating the first signal to the host to request that the host transmit the status information to the file server;
the host reading the status information from the fourth data storage device;
the host transmitting the status information to the file server;

(b) steps (x) through (dd) of claim 1 comprise:
the file server generating the fifth signal to the host to request that the host accept the setting information from the file server;
the host generating the sixth signal to the file server to request that the file server transmit the setting information to the host;
the host receiving the setting information from the file server;
the host storing the setting information in the fourth data storage device;
the Multifunction peripheral generating a seventh signal to the host to request that the host transmit the setting information to the multifunction peripheral;
the multifunction peripheral receiving the setting information from the host;
the multifunction peripheral modifying its operation in accordance with the setting information.

12. The method of allowing a user at a workstation to control settings of an intelligent peripheral device under control of a file server of claim 1,
the host generating a seventh signal to the multifunction peripheral to request that the multifunction peripheral accept the setting information from the host;
the multifunction peripheral generating an eighth signal to the host to request that the host transmit the setting information to the multifunction peripheral;
the host reading the setting information from the fourth data storage device,
the host transmitting the setting information to the multifunction peripheral;
the multifunction peripheral receiving the setting information from the host,
the multifunction peripheral storing the setting information in the multifunction peripheral,
the multifunction peripheral modifying its operation in accordance with the setting information.

13. The method of allowing a user at a workstation to control settings of an intelligent peripheral device under control of a file server of claim 1, wherein the step of the host generating the seventh signal to the multifunction peripheral to request that the multifunction peripheral transmit the status information to the host is performed periodically according to a predetermined timing rule.

14. The method of allowing a user at a workstation to control settings of an intelligent peripheral device under control of a file server of claim 1, wherein the step of the host generating the seventh signal to the multifunction peripheral to request that the multifunction peripheral transmit the status information to the host is performed in response to:
the workstation, at a prior time, generating the second signal to the file server to request that the file server transmit the status information to the workstation, and
the file server generating the first signal to the host to request that the host transmit the status information to the file server.

* * * * *